United States Patent
Wang (10) Patent No.: US 11,493,366 B2
(45) Date of Patent: Nov. 8, 2022

(54) ROTARY MOTION DETECTING DEVICE

(71) Applicant: FANUC CORPORATION, Minamitsuru-gun (JP)

(72) Inventor: Miaomiao Wang, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 63 days.

(21) Appl. No.: 16/934,351

(22) Filed: Jul. 21, 2020

(65) Prior Publication Data

US 2021/0033429 A1 Feb. 4, 2021

(30) Foreign Application Priority Data

Jul. 29, 2019 (JP) .............................. JP2019-138652

(51) Int. Cl.
*G01D 5/34* (2006.01)
*G01D 5/347* (2006.01)

(52) U.S. Cl.
CPC ..... *G01D 5/34738* (2013.01); *G01D 5/34707* (2013.01)

(58) Field of Classification Search
CPC ........... G01D 5/34707; G01D 5/34738; G01D 5/34753
See application file for complete search history.

(56) References Cited

U.S. PATENT DOCUMENTS

| 6,255,644 B1 * | 7/2001 | Taniguchi | G01D 5/347 250/231.13 |
| 2012/0006982 A1 | 1/2012 | Satone et al. | |
| 2018/0259369 A1 | 9/2018 | Fukuda et al. | |

FOREIGN PATENT DOCUMENTS

| JP | 2018-151178 A | 9/2018 |
| WO | WO 2010/119513 A1 | 10/2010 |

* cited by examiner

*Primary Examiner* — Kevin K Pyo
(74) *Attorney, Agent, or Firm* — McGinn I.P. Law Group, PLLC.

(57) ABSTRACT

In a rotary motion detecting device that outputs a signal corresponding to rotary motion of a rotary disk coupled to a shaft, a boss is fixed to the shaft, the boss is fixed to one surface of the rotary disk, and one of the boss and the shaft is a hole member having a hole formed therein and the other is an inserted member that is inserted in the hole. The hole member has an inner periphery (inner diameter) that is larger than an outer periphery (outer diameter) of the inserted member so that the shaft can be vertical to the rotary disk without being restricted by the boss.

19 Claims, 12 Drawing Sheets

FIG. 3

ROTARY MOTION DETECTING DEVICE

CROSS-REFERENCE TO RELATED APPLICATION

This application is based upon and claims the benefit of priority from Japanese Patent Application No. 2019-138652 filed on Jul. 29, 2019, the contents of which are incorporated herein by reference.

BACKGROUND OF THE INVENTION

Field of the Invention

The present invention relates to a rotary motion detecting device configured to output a signal according to rotary motion of a rotary disk coupled to a shaft, such as a rotary encoder, for example.

Description of the Related Art

International Publication No. WO 2010/119513 discloses a rotary motion detecting device (rotary encoder) that outputs a signal corresponding to rotary motion of a rotary disk coupled to a shaft. In this rotary motion detecting device, a boss is fixed to the rotary disk having slits, and the shaft, such as a motor's output shaft or a rotary shaft coupled to the output shaft, is fitted in the boss.

SUMMARY OF THE INVENTION

When the boss is fixed to the rotary disk with an adhesive and if the thickness of the adhesive is nonuniform, then the axis line of the rotary disk is inclined with respect to the axis line of the boss. The axis line of the rotary disk will then be inclined also with respect to the axis line of the shaft. This will cause the height of the outer circumference of the rotary disk to be nonuniform and then the surface of the rotary disk will wobble while it rotates. Small-sized rotary encoders are especially prone to surface wobbling of the rotary disk. Surface wobbling adversely affects accuracy of the rotary encoders.

Accordingly, an object of the present invention is to provide a rotary motion detecting device capable of preventing surface wobbling.

An aspect of the present invention is directed to a rotary motion detecting device that outputs a signal corresponding to a rotary motion of a rotary disk coupled to a shaft, wherein a boss is fixed to the shaft, the boss is fixed to one surface of the rotary disk, and one of the boss and the shaft is a hole member including a hole formed therein and another is an inserted member that is inserted in the hole, and wherein the hole member has an inner periphery that is larger than an outer periphery of the inserted member so that the shaft is vertical to the rotary disk without being restricted by the boss.

According to the present invention, the shaft can be vertical to the rotary disk without being restricted by the boss, and it is therefore possible to prevent surface wobbling of the rotary disk.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The rotary motion detecting device according to the present invention will now be described below in detail in connection with preferred embodiments while referring to the accompanying drawings.

1. First Embodiment

1.1. Rotary Motion Detecting Device 10

Figure 1:
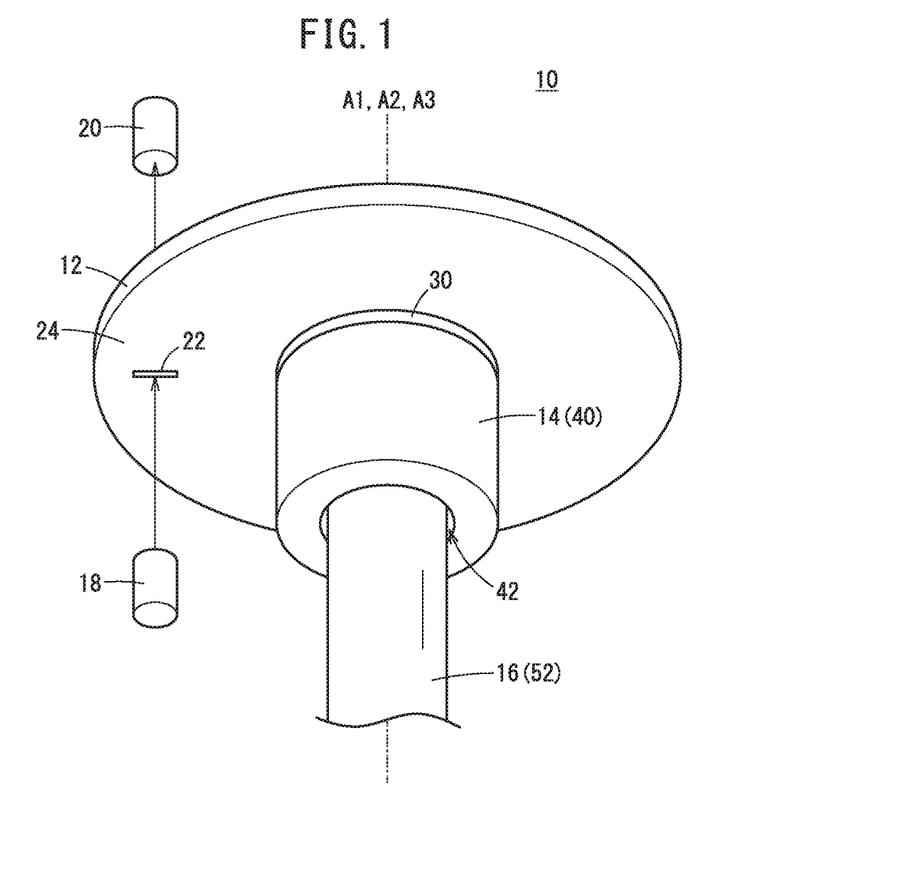
FIG. 1 is a diagram illustrating the configuration of a rotary motion detecting device according to a first embodiment.

The basic structure of a rotary motion detecting device 10 will be described referring to FIGS. 1 and 2. The rotary motion detecting device 10 includes a rotary disk 12, a boss 14, a shaft 16, a light emitting element 18, and a light receiving element (optical receiver) 20. In the first embodiment, the boss 14 is a hole member 40 having a hole 42, and the shaft 16 is an inserted member 52 that is inserted in the hole 42.

The rotary disk 12 is made of glass, resin, or metal. The rotary disk 12 is shaped as a circular plate and has a plurality of slits 22 arranged at equal intervals along its circumferential direction. Note that FIG. 1 only shows one slit 22. The boss 14 is made of resin or metal. The boss 14 has an opening of the hole 42 at one end in its axis line direction and has a bonded surface 28 at the other end in its axis line direction. The hole 42 may be bottomed or may pass through from one end to the other end of the axis line direction of the boss 14. The bonded surface 28 of the boss 14 is fixed to one surface 24 of the rotary disk 12 with an adhesive 30. The shaft 16 is made of metal. One end of the shaft 16 is inserted in the hole 42 of the boss 14. The shaft 16 may be an object whose rotary motion is to be detected (e.g., an output shaft of a motor or the like), or may be a rotary shaft coupled to an object to be detected through a coupling or the like. The shaft 16 is vertical to the rotary disk 12, and the axis line A1 of the rotary disk 12 and the axis line A3 of the shaft 16 coincide with each other. The boss 14 and the shaft 16 are fixed together by a fixing member (see section [1.2] below).

The light emitting element 18 includes a light emitting device such as an LED etc. The light receiving element 20 includes a light receiving device such as a photodiode etc. The light emitting element 18 and the light receiving element 20 face toward each other with the rotary disk 12 interposed therebetween.

In cases where the shaft 16 is an output shaft of a motor etc., the components other than the shaft 16 constitute a hollow shaft-type rotary encoder. On the other hand, in cases where the shaft 16 is coupled to an output shaft of a motor etc. through a coupling or the like, the rotary motion detecting device 10 is a shaft-type rotary encoder.

Operations of the rotary motion detecting device 10 will be described. As the rotary shaft (shaft 16) of a motor or the like rotates, the rotary disk 12 rotates around the axis lines A1, A3. Then, the plurality of slits 22 sequentially pass between the light emitting element 18 and the light receiving element 20. When the light emitting element 18, the light receiving element 20, and a slit 22 are aligned on a straight line, the light emitted from the light emitting element 18 passes through the slit 22 and is received at the light receiving element 20. On the other hand, the light emitted from the light emitting element 18 is interrupted by the rotary disk 12 when the light emitting element 18, the light receiving element 20, and a slit 22 are not aligned on the straight line. The light receiving element 20 outputs an ON signal when it receives light, and outputs an OFF signal when it receives no light.

1.2. Structure for Fixing Boss 14 (Hole Member 40) and Shaft 16 (Inserted Member 52)

Structures for fixing the boss 14 and the shaft 16 will be explained with first to fifth specific examples shown in FIGS. 2 to 7. In the first to fifth specific examples, the inner peripheral shape of the hole 42 of the boss 14 and the outer peripheral shape of the shaft 16 are both substantially circular. An inner diameter R2 of the hole 42 of the boss 14 is formed larger than an outer diameter R1 of the shaft 16 so that the shaft 16 can be made vertical to the rotary disk 12 without being restricted by the boss 14. Since the inner diameter R2 is larger than the outer diameter R1, the angle of the shaft 16 with respect to the rotary disk 12 can be adjusted before the shaft 16 inserted in the hole 42 is fixed to the boss 14.

1.2.1. First Specific Example

Figure 2:
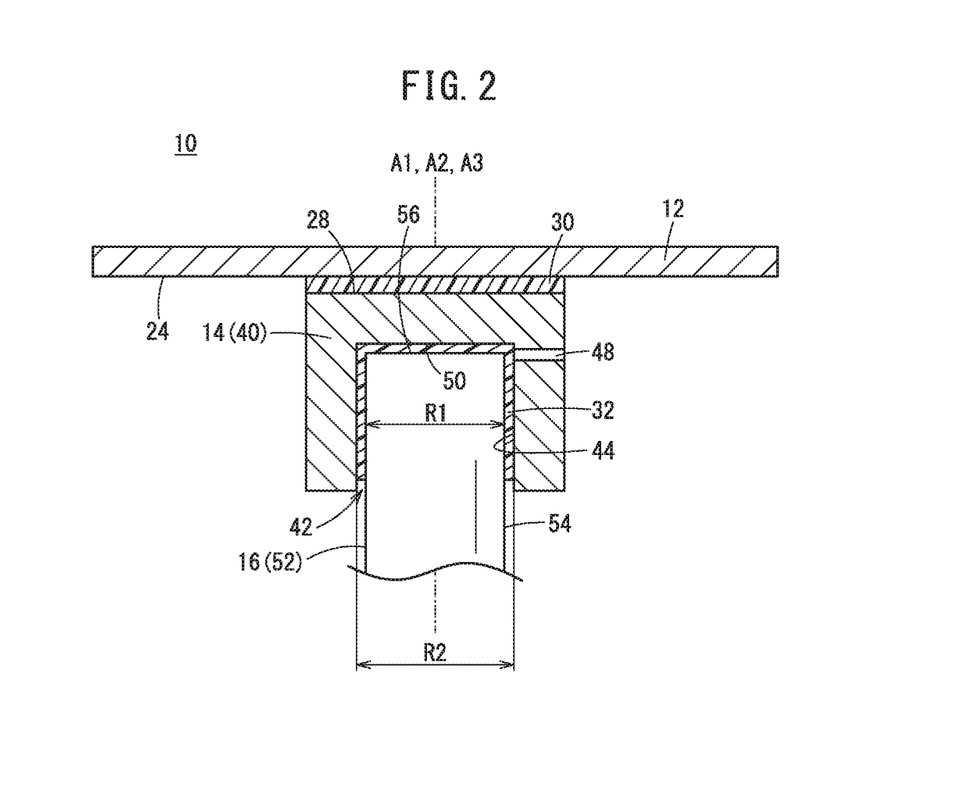
FIG. 2 is a diagram showing the configuration of a first specific example of the first embodiment in a cross section parallel to axis lines.
Figure 3:
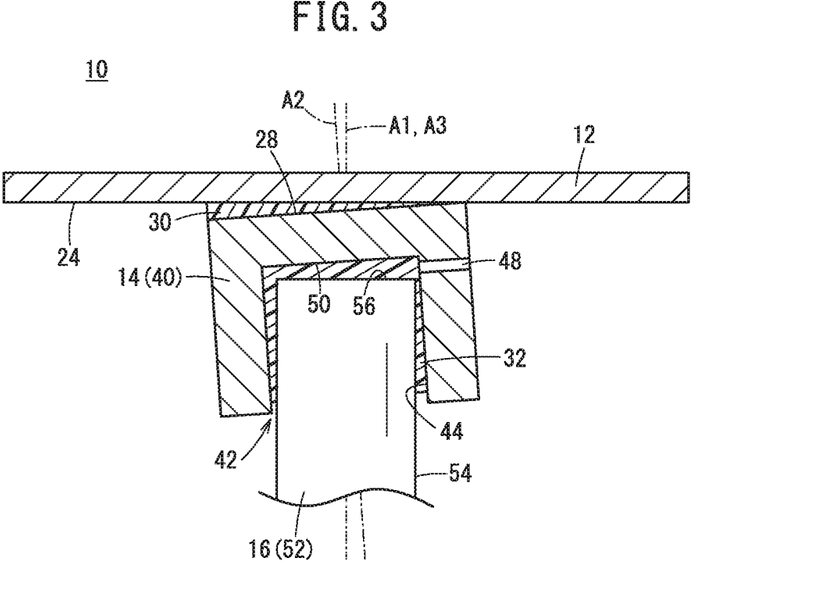
FIG. 3 is a diagram showing another implementation of the first specific example of the first embodiment in a cross section parallel to the axis lines.

Referring to FIGS. 2 and 3, a first specific example using a thermoset resin 32 as the fixing member will be described. Because the inner diameter R2 of the hole 42 of the boss 14 is larger than the outer diameter R1 of the shaft 16, a space is formed between an inner peripheral surface 44 of the boss 14 and an outer peripheral surface 54 of the shaft 16 when the shaft 16 is inserted in the hole 42. In the first specific example, with the shaft 16 inserted in the hole 42 of the boss 14, the thermoset resin 32, e.g., epoxy resin etc., is injected into the space between the boss 14 and the shaft 16. The thermoset resin 32 is injected into the interior of the hole 42 from a resin injection hole 48 passing through the boss 14 from its outer peripheral side to inner peripheral side.

The thermoset resin 32 fixes the boss 14 and the shaft 16 together without the inner peripheral surface 44 of the boss 14 and the outer peripheral surface 54 of the shaft 16 being in contact along the depth direction of the hole 42. More specifically, the thermoset resin 32 fixes the boss 14 and the shaft 16 together without the inner peripheral surface 44 of the boss 14 and the outer peripheral surface 54 of the shaft 16 being in contact. However, note that the thermoset resin 32 may fix the boss 14 and the shaft 16 together, with the inner peripheral surface 44 of the boss 14 and the outer peripheral surface 54 of the shaft 16 being in point contact with each other, or in line contact with each other along the peripheral direction of the inner peripheral surface 44 of the boss 14.

As shown in FIGS. 2 and 3, the shaft 16 is vertical to the rotary disk 12, with the rotary disk 12, the boss 14, and the shaft 16 fixed together. In this state, the axis line A1 of the rotary disk 12 and the axis line A3 of the shaft 16 coincide with each other. As shown in FIG. 2, when the thickness of the adhesive 30 is uniform, the axis line A2 of the boss 14 coincides with the axis line A1 of the rotary disk 12 and with the axis line A3 of the shaft 16. On the other hand, as shown in FIG. 3, when the thickness of the adhesive 30 is not uniform, the axis line A2 of the boss 14 is inclined with respect to the axis line A1 of the rotary disk 12 and the axis line A3 of the shaft 16.

If the inner peripheral surface 44 of the boss 14 and the outer peripheral surface 54 of the shaft 16 are in contact with each other along the depth direction of the hole 42, then the axis line A3 of the shaft 16 coincides with or is parallel to the axis line A2 of the boss 14. When the thickness of the adhesive 30 is not uniform and the axis line A2 of the boss 14 is inclined with respect to the axis line A1 of the rotary disk 12, then the axis line A3 of the shaft 16 is also inclined with respect to the axis line A1 of the rotary disk 12. In this case, the rotary disk 12 will wobble considerably while the rotary disk 12 rotates as the shaft 16 rotates. In contrast, in the case of the first specific example shown in FIGS. 2 and 3, the axis line A1 of the rotary disk 12 and the axis line A3 of the shaft 16 coincide with each other. This prevents the surface wobbling when the rotary disk 12 rotates as the shaft 16 rotates. The specific examples shown below also offer the same effect.

1.2.2. Second Specific Example

Figure 4:
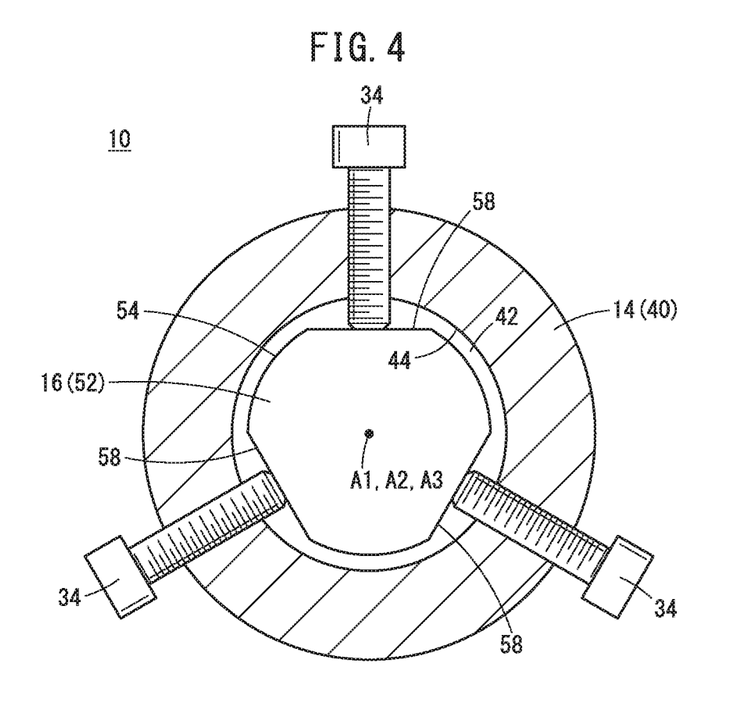
FIG. 4 is a diagram showing the configuration of a second specific example of the first embodiment in a cross section orthogonal to the axis lines.

Referring to FIG. 4, a second specific example using three or more screws 34 as the fixing member will be described. The screws 34 may be pins. In this second specific example, with the shaft 16 inserted in the hole 42 of the boss 14, the three screws 34 are thrusted from three directions, from the outer peripheral side to the inner peripheral side of the boss 14. The three screws 34 are disposed at the same height positions. The distal ends of the individual screws 34 abut on flat surfaces 58 formed at the outer peripheral surface 54 of the shaft 16. The shaft 16 is thus supported at three points. Note that it is not always necessary to form the flat surfaces 58 at the outer peripheral surface 54 of the shaft 16.

As in the first specific example, the screws 34 fix the boss 14 and the shaft 16 together without the inner peripheral surface 44 of the boss 14 and the outer peripheral surface 54 of the shaft 16 being in contact along the depth direction of the hole 42. More specifically, the screws 34 fix the boss 14 and the shaft 16 together without the inner peripheral surface 44 of the boss 14 and the outer peripheral surface 54 of the shaft 16 being in contact with each other. However, note that the screws 34 may fix the boss 14 and the shaft 16 together, with the inner peripheral surface 44 of the boss 14 and the outer peripheral surface 54 of the shaft 16 being in point contact with each other, or in line contact with each other along the peripheral direction of the inner peripheral surface 44 of the boss 14.

1.2.3. Third Specific Example

Figure 5:
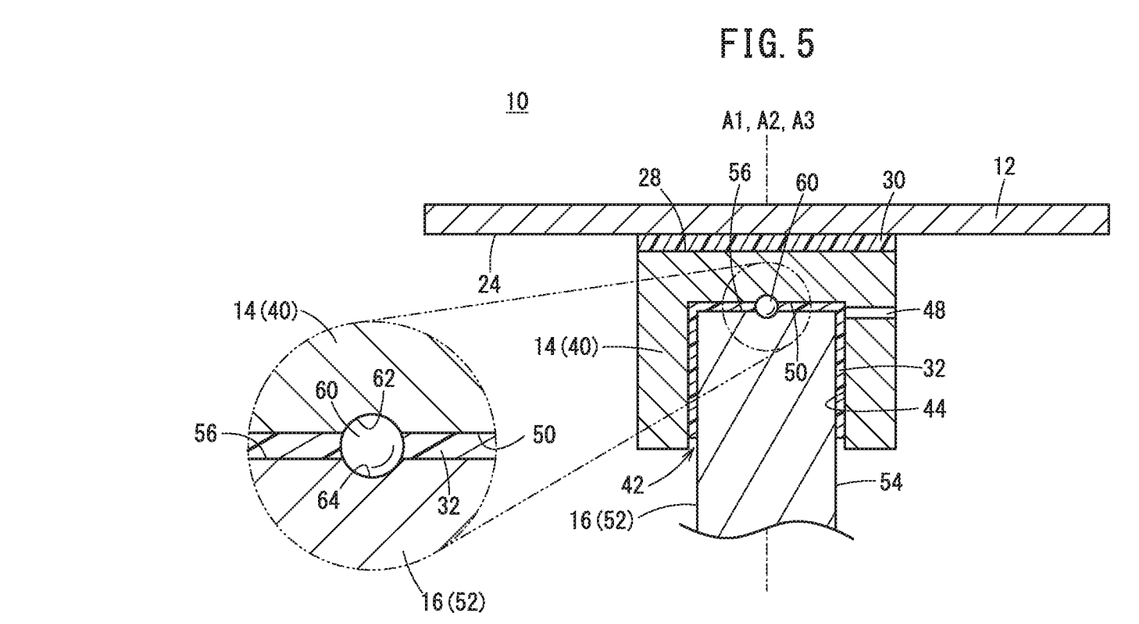
FIG. 5 is a diagram showing the configuration of a third specific example of the first embodiment in a cross section parallel to the axis lines.

Referring to FIG. 5, a third specific example will be described. The third specific example is a modification of the first specific example. The basic structure of the third specific example is the same as the structure of the first specific example. Differences between the third specific example and the first specific example will be described. The rotary motion detecting device 10 of the third specific example includes a spherical body 60 that is interposed between a bottom surface 50 located at the bottom of the hole 42 of the boss 14 and an end surface 56 of the inserted member 52 (shaft 16) facing the bottom surface 50. The spherical body 60 is a positioning member.

The bottom surface 50 of the boss 14 has a concavity formed in its center, where the length of the concavity in the depth direction is shorter than the radius of the spherical body 60, and the diameter of its opening is shorter than the diameter of the spherical body 60. This concavity will be referred to as a first hollow 62. The first hollow 62 has a circular shape or a spherical shape.

Similarly, the end surface 56 of the shaft 16 has a concavity formed in its center, where the length of the concavity in the depth direction is shorter than the radius of the spherical body 60 and the diameter of its opening is shorter than the diameter of the spherical body 60. This concavity will be referred to as a second hollow 64. The second hollow 64 has a circular shape or a spherical shape.

When the boss 14 is fixed to the rotary disk 12, the first hollow 62 is positioned on the axis line A1 of the rotary disk 12. Before the shaft 16 is fixed to the boss 14, part of the spherical body 60 is fitted in the first hollow 62 and another part of the spherical body 60 is fitted in the second hollow 64. With the spherical body 60 fitted in the first hollow 62 and the second hollow 64, a space is left between the bottom surface 50 of the boss 14 and the end surface 56 of the shaft 16. Accordingly, the shaft 16 is swingable on the spherical body 60 relative to the boss 14. In this state, the angle of inclination of the shaft 16 with respect to the rotary disk 12 is suitably adjusted, so as to achieve centering of the axis line A1 of the rotary disk 12 and the axis line A3 of the shaft 16. Also, the axis line A1 of the rotary disk 12 and the axis line A3 of the shaft 16 are made vertical. After that, the thermoset resin 32 is filled in between the shaft 16 and the boss 14 to thereby fix the shaft 16 and the boss 14 together.

1.2.4. Fourth Specific Example

Figure 6:
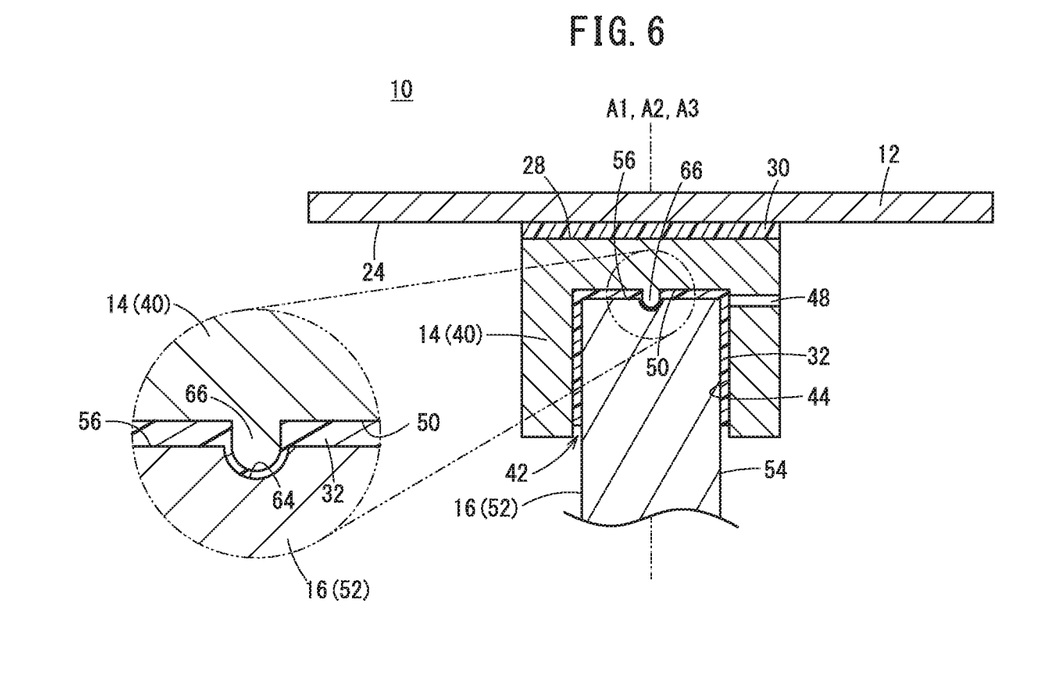
FIG. 6 is a diagram showing the configuration of a fourth specific example of the first embodiment in a cross section parallel to the axis lines.

Referring to FIG. 6, a fourth specific example will be described. The fourth specific example is a modification of the first and third specific examples. In the third specific example described above, the first hollow 62 was formed in the bottom surface 50 of the boss 14 and the spherical body 60 was fitted in the first hollow 62. In contrast, in the fourth specific example, a bump is formed in the center of the bottom surface 50 of the boss 14. This bump will be referred to as a protrusion 66. The height of the protrusion 66 is larger than the depth of the second hollow 64 formed in the shaft 16. The second hollow 64 in the fourth specific example is mortar-shaped. FIG. 6 shows the protrusion 66 and the second hollow 64 as if they are spaced apart, but they are actually abutting on each other.

With the protrusion 66 abutting on the second hollow 64, a space remains between the bottom surface 50 of the boss 14 and the end surface 56 of the shaft 16. Accordingly, the shaft 16 can swing relative to the boss 14 on the place where the protrusion 66 and the second hollow 64 abut on each other. In this state, the angle of inclination of the shaft 16 relative to the rotary disk 12 is suitably adjusted, so as to achieve centering of the axis line A1 of the rotary disk 12 and the axis line A3 of the shaft 16. Further, the axis line A1 of the rotary disk 12 and the axis line A3 of the shaft 16 are made vertical. After that, the thermoset resin 32 is filled in between the shaft 16 and the boss 14, to thereby fix the shaft 16 and the boss 14 to each other.

1.2.5. Fifth Specific Example

Figure 7:
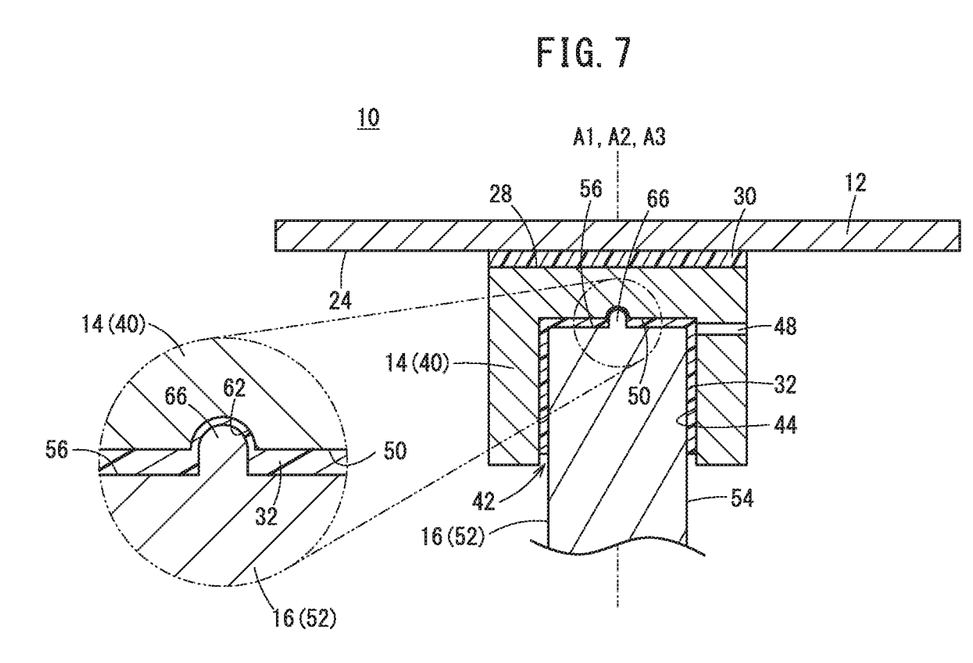
FIG. 7 is a diagram showing the configuration of a fifth specific example of the first embodiment in a cross section parallel to the axis lines.
Figure 8:
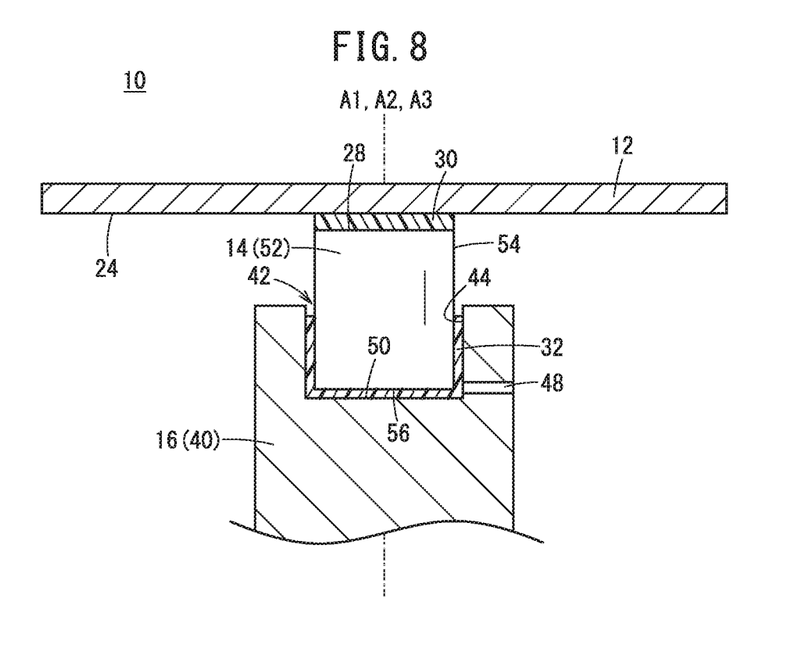
FIG. 8 is a diagram showing the configuration of a sixth specific example according to a second embodiment in a cross section parallel to the axis lines.
Figure 9:
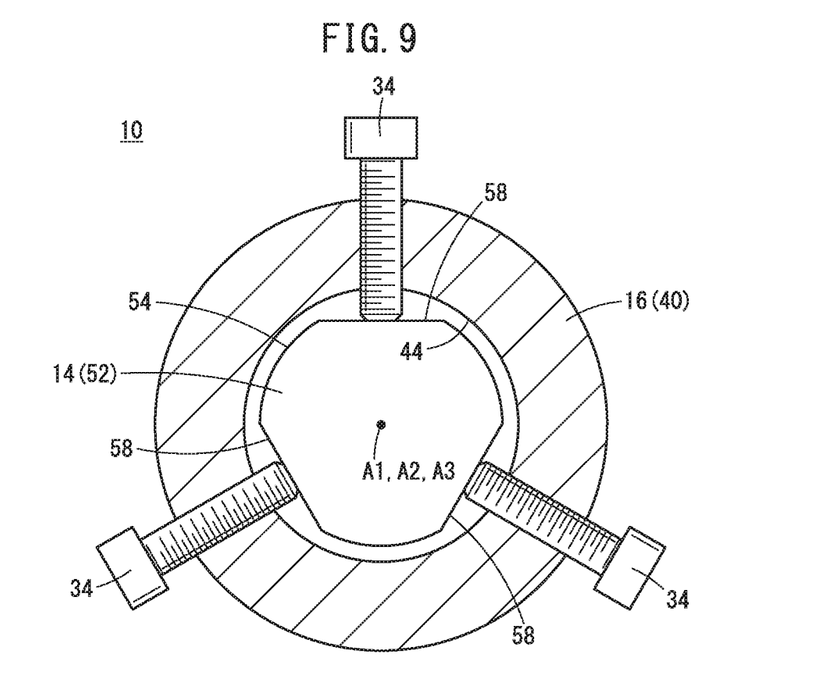
FIG. 9 is a diagram showing the configuration of a seventh specific example of the second embodiment in a cross section orthogonal to the axis lines.
Figure 10:
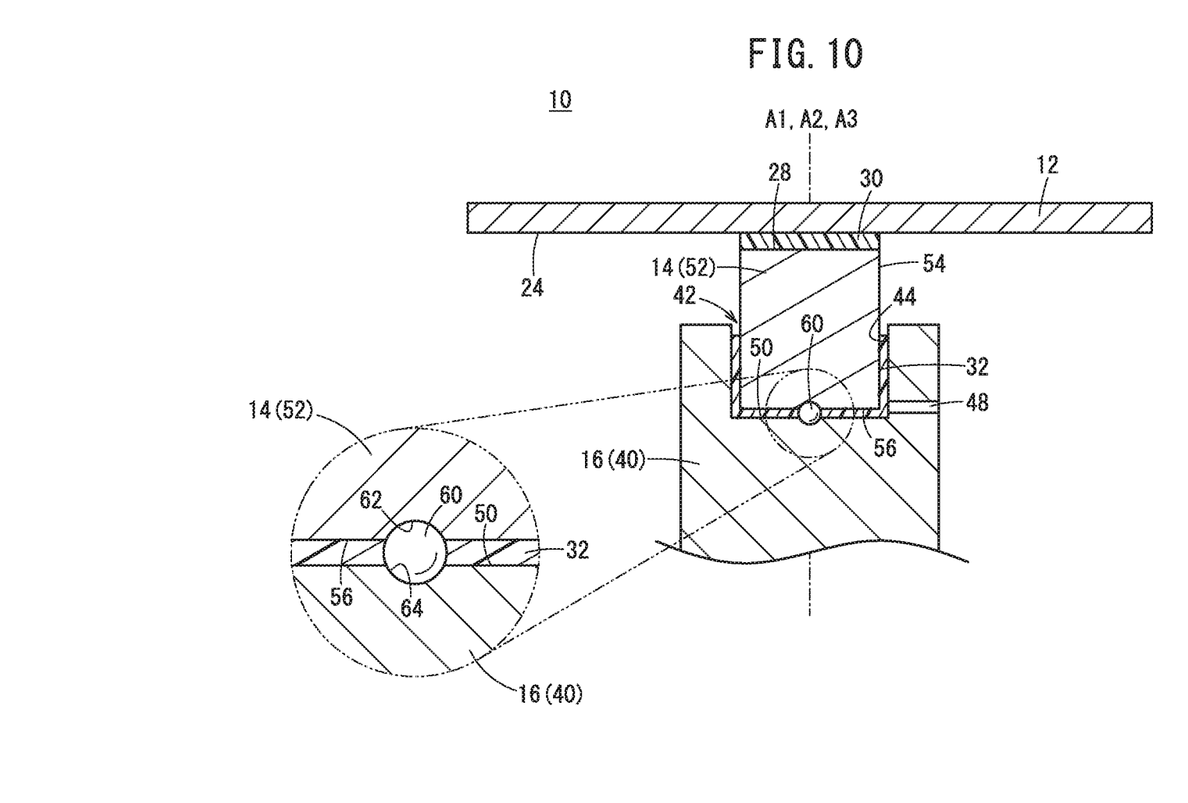
FIG. 10 is a diagram showing the configuration of an eighth specific example of the second embodiment in a cross section parallel to the axis lines.
Figure 11:
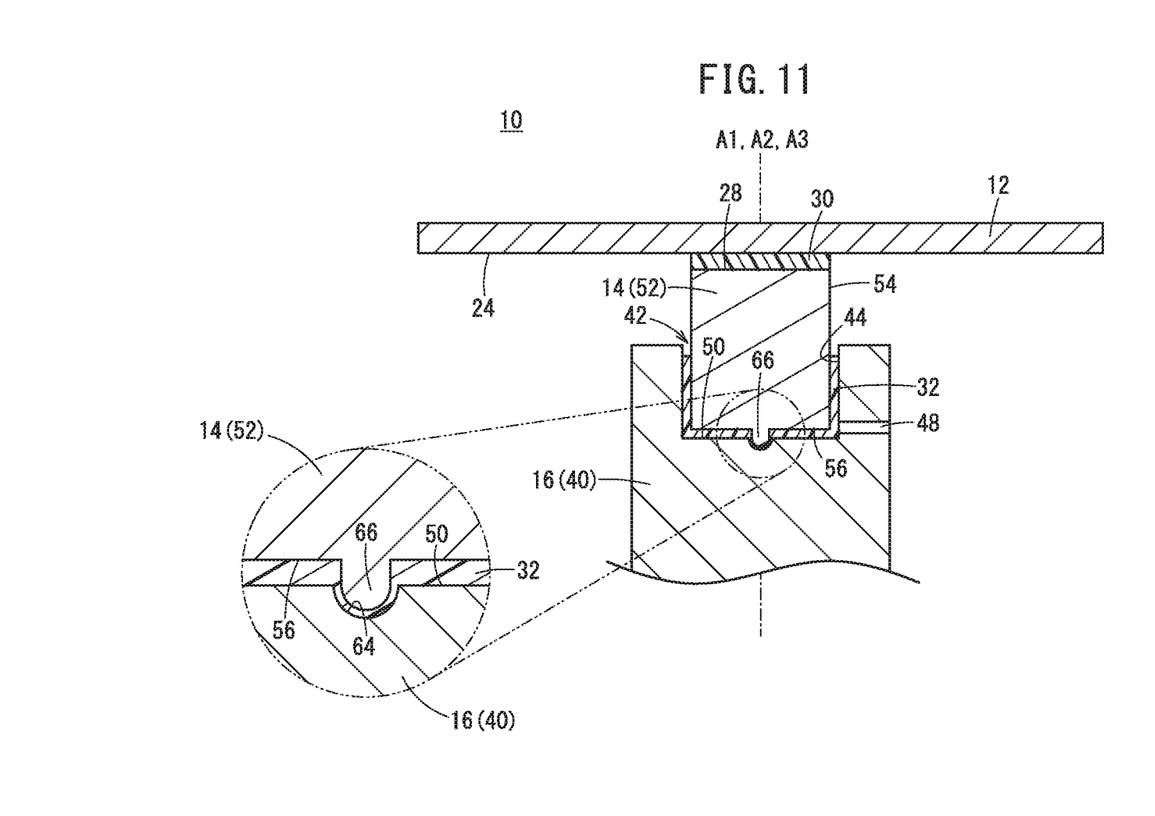
FIG. 11 is a diagram showing the configuration of a ninth specific example of the second embodiment in a cross section parallel to the axis lines.
Figure 12:
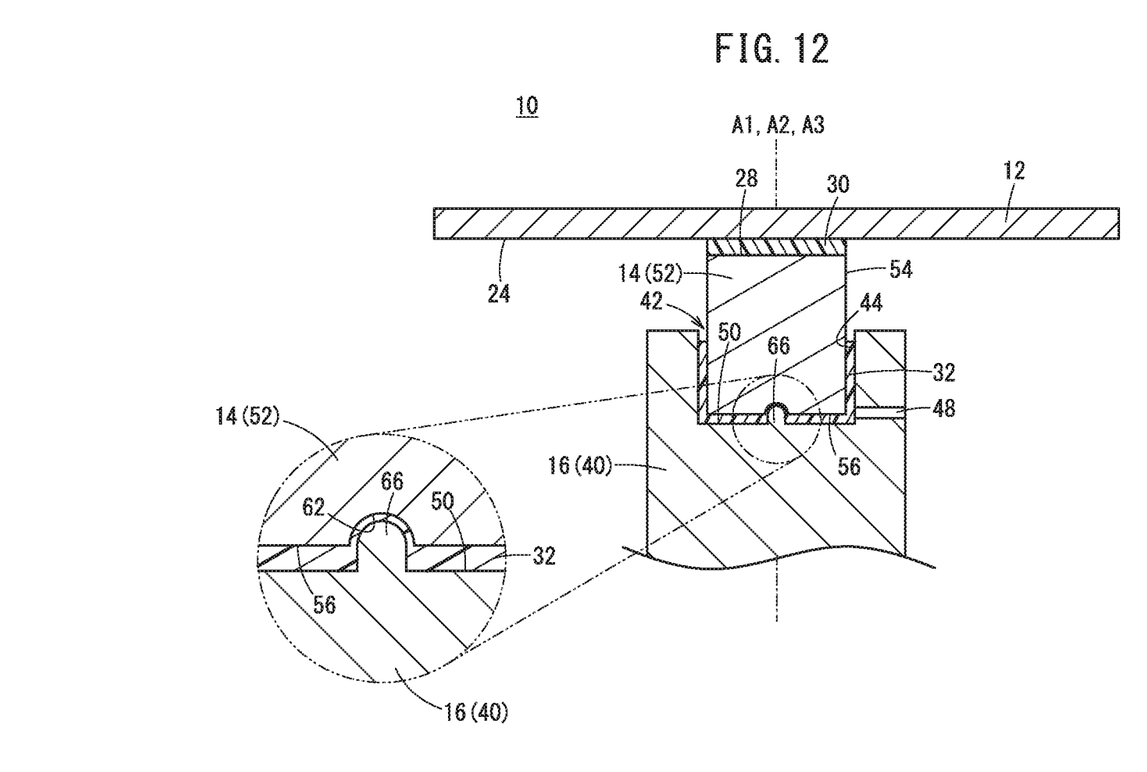
FIG. 12 is a diagram showing the configuration of a tenth specific example of the second embodiment in a cross section parallel to the axis lines.

Referring to FIG. 7, a fifth specific example will be described. The fifth specific example is a modification of the first, third, and fourth specific examples. In the fourth specific example described above, the bump (projection 66) was formed in the center of the bottom surface 50 of the boss 14 and the concavity (second hollow 64) was formed in the center of the end surface 56 of the shaft 16. In contrast, as shown in this fifth specific example, a concavity (first hollow 62) may be formed in the center of the bottom surface 50 of the boss 14 and a bump (protrusion 66) may be formed in the center of the end surface 56 of the shaft 16. FIG. 7 shows the protrusion 66 and the first hollow 62 as if they are spaced apart, but the two are actually abutting on each other.

1.2.6. Other Examples

The third to fifth specific examples correspond to modifications of the first specific example. However, the third to fifth specific examples can be applied also to the second specific example where the screws 34 constitute the fixing member.

2. Second Embodiment

In the rotary motion detecting device 10 of the first embodiment, the boss 14 is the hole member 40 and the shaft 16 is the inserted member 52. On the other hand, as shown with the rotary motion detecting devices 10 depicted in FIGS. 8 to 12, the shaft 16 may be the hole member 40 having the hole 42 and the boss 14 may be the inserted member 52 that is inserted in the hole 42.

The first to fifth specific examples of the first embodiment can be applied also to a second embodiment. FIGS. 8 to 12 show examples thereof. A sixth specific example shown in FIG. 8 corresponds to the first specific example of the first embodiment shown in FIG. 2. A seventh specific example shown in FIG. 9 corresponds to the second specific example of the first embodiment shown in FIG. 4. An eighth specific example shown in FIG. 10 corresponds to the third specific example of the first embodiment shown in FIG. 5. A ninth specific example shown in FIG. 11 corresponds to the fourth specific example of the first embodiment shown in FIG. 6. A tenth specific example shown in FIG. 12 corresponds to the fifth specific example of the first embodiment shown in FIG. 7.

The sixth to tenth specific examples are the same as the first to fifth specific examples, respectively, except that the hole member 40 is the shaft 16 and the inserted member 52 is the boss 14. Accordingly, the components are labeled with the same reference numerals and not described again here.

3. Invention Obtained from Embodiments

The invention graspable from the embodiments and modifications described above will be recited below.

An aspect of the present invention is directed to the rotary motion detecting device 10 that outputs a signal corresponding to a rotary motion of the rotary disk 12 coupled to the shaft 16, wherein the boss 14 is fixed to the shaft 16, the boss 14 is fixed to one surface 24 of the rotary disk 12, and one of the boss 14 and the shaft 16 is the hole member 40 including the hole 42 formed therein and the other is the inserted member 52 that is inserted in the hole 42, and wherein the hole member 40 has an inner periphery (inner diameter R2) that is larger than an outer periphery (outer diameter R1) of the inserted member 52 so that the shaft 16 is vertical to the rotary disk 12 without being restricted by the boss 14.

According to the configuration above, the inner periphery of the hole member 40, e.g., the inner diameter R2 of the boss 14, is formed larger than the outer periphery of the inserted member 52, e.g., the outer diameter R1 of the shaft 16. Accordingly, the angle of the shaft 16 with respect to the rotary disk 12 can be adjusted before the inserted member 52 (e.g., the shaft 16) is inserted in the hole 42 and fixed to the hole member 40 (e.g., the boss 14). With this structure, even if the boss 14 is fixed to the rotary disk 12 at an angle, the shaft 16 can be made vertical to the rotary disk 12 without being affected by the inclination of the boss 14. In this way, this configuration reduces surface wobbling of the rotary disk 12 since the shaft 16 is made vertical to the rotary disk 12 without being restricted by the boss 14.

In the aspect of the invention, the rotary motion detecting device 10 may further include the fixing member (the thermoset resin 32, the screws 34) that fixes the hole member 40 and the inserted member 52 together without the inner peripheral surface 44 of the hole member 40 (e.g., the boss 14) and the outer peripheral surface 54 of the inserted member 52 (e.g., the shaft 16) being in contact with each other along a depth direction of the hole 42.

According to this configuration, the inner peripheral surface 44 of the hole member 40 (e.g., the boss 14) and the outer peripheral surface 54 of the inserted member 52 (e.g., the shaft 16) do not contact along the depth direction of the hole 42, and it is therefore possible to independently adjust the inclination of the boss 14 and the inclination of the shaft 16 with respect to the rotary disk 12. With this structure, even if the boss 14 is fixed to the rotary disk 12 at an angle, the shaft 16 can be made vertical to the rotary disk 12 without being affected by the inclination of the boss 14. This reduces surface wobbling of the rotary disk 12.

In the aspect of the invention, the fixing member (the thermoset resin 32, the screws 34) may fix the hole member 40 and the inserted member 52 together without the inner peripheral surface 44 of the hole member 40 (e.g., the boss 14) and the outer peripheral surface 54 of the inserted member 52 (e.g., the shaft 16) being in contact with each other.

According to this configuration, the inner peripheral surface 44 of the hole member 40 (e.g., the boss 14) and the outer peripheral surface 54 of the inserted member 52 (e.g., the shaft 16) do not contact, and it is therefore possible to independently adjust the inclination of the boss 14 and the inclination of the shaft 16 with respect to the rotary disk 12. With this structure, even if the boss 14 is fixed to the rotary disk 12 at an angle, the shaft 16 can be made vertical to the rotary disk 12 without being affected by the inclination of the boss 14. This reduces surface wobbling of the rotary disk 12.

In the aspect of the invention, the fixing member may be the thermoset resin 32 filled in a space between the hole member 40 (e.g., the boss 14) and the inserted member 52 (e.g., the shaft 16).

In the aspect of the invention, the fixing member may include screws 34 or pins that are inserted from an outer peripheral side to an inner peripheral side of the hole member 40 (e.g., the boss 14) to abut on the outer peripheral surface 54 (the flat surfaces 58) of the inserted member 52 (e.g., the shaft 16).

In the aspect of the invention, the rotary motion detecting device 10 may further include a positioning member (the spherical body 60) interposed between the bottom surface 50 located at a bottom of the hole 42 and the end surface 56 of the inserted member 52 (e.g., the shaft 16) that faces the bottom surface 50, wherein the positioning member (the spherical body 60) may abut on a first portion (e.g., the first hollow 62) of the bottom surface 50 and a second portion (e.g., the second hollow 64) of the end surface 56 and the respective axis lines (the axis lines A1, A3) of the rotary disk 12 and the shaft 16 coincide with each other.

In the aspect of the invention, the positioning member may be the spherical body 60, and the first hollow 62 in which the spherical body 60 is fitted may be formed in the first portion of the bottom surface 50 and the second hollow 64 in which the spherical body 60 is fitted may be formed in the second portion of the end surface 56.

According to the configuration above, the hole member 40 (e.g., the boss 14) and the inserted member 52 (e.g., the shaft 16) are swingable with respect to each other. When the first hollow 62 and the second hollow 64 are positioned so that the spherical body 60 is positioned on the axis line A1 of the rotary disk 12 and the axis line A3 of the shaft 16, then the shaft 16 can be swung on the spherical body 60 so as to achieve centering of the rotary disk 12 and the shaft 16.

In the aspect of the invention, one of the bottom surface 50 located at the bottom of the hole 42 and the end surface 56 of the inserted member 52 (e.g., the shaft 16) that faces the bottom surface 50 may have a hollow (the first hollow 62, the second hollow 64) and the other may have the protrusion 66, and the hollow (the first hollow 62, the second hollow 64) and the protrusion 66 may abut on each other and the respective axis lines (the axis lines A1, A3) of the rotary disk 12 and the shaft 16 coincide with each other.

According to the configuration above, the hole member 40 (e.g., the boss 14) and the inserted member 52 (e.g., the shaft 16) can swing with respect to each other. When the hollow (the first hollow 62, the second hollow 64) and the protrusion 66 are positioned on the axis line A1 of the rotary disk 12 and the axis line A3 of the shaft 16, then the shaft 16 can be swung on the protrusion 66 so as to achieve centering of the rotary disk 12 and the shaft 16.

The rotary motion detecting device according to the present invention is not limited to the embodiments and modifications described above and can adopt various configurations without departing from the essence and gist of the present invention.

What is claimed is:

1. A rotary motion detecting device that outputs a signal corresponding to a rotary motion of a rotary disk coupled to a shaft,
wherein a boss is fixed to the shaft,
the boss is fixed to one surface of the rotary disk, and
one of the boss and the shaft is a hole member including a hole formed therein and another is an inserted member that is inserted in the hole, and
wherein the hole member has an inner periphery that is larger than an outer periphery of the inserted member so that the shaft is vertical to the rotary disk without being restricted by the boss,
further comprising a fixing member that fixes the hole member and the inserted member together without an inner peripheral surface of the hole member and an outer peripheral surface of the inserted member being in contact with each other along a depth direction of the hole.

2. The rotary motion detecting device according to claim 1, wherein the fixing member fixes the hole member and the inserted member together without the inner peripheral surface of the hole member and the outer peripheral surface of the inserted member being in contact with each other.

3. The rotary motion detecting device according to claim 1, wherein the fixing member is a thermoset resin filled in a space between the hole member and the inserted member.

4. The rotary motion detecting device according to claim 1, wherein the fixing member comprises screws or pins that are inserted from an outer peripheral side to an inner peripheral side of the hole member to abut on the outer peripheral surface of the inserted member.

5. A rotary motion detecting device that outputs a signal corresponding to a rotary motion of a rotary disk coupled to a shaft,
wherein a boss is fixed to the shaft,
the boss is fixed to one surface of the rotary disk, and
one of the boss and the shaft is a hole member including a hole formed therein and another is an inserted member that is inserted in the hole, and
wherein the hole member has an inner periphery that is larger than an outer periphery of the inserted member so that the shaft is vertical to the rotary disk without being restricted by the boss,
further comprising a positioning member interposed between a bottom surface located at a bottom of the hole and an end surface of the inserted member that faces the bottom surface,
wherein the positioning member abuts on a first portion of the bottom surface and a second portion of the end surface and respective axis lines of the rotary disk and the shaft coincide with each other.

6. The rotary motion detecting device according to claim 5, wherein
the positioning member is a spherical body, and
a first hollow in which the spherical body is fitted is formed in the first portion of the bottom surface and a second hollow in which the spherical body is fitted is formed in the second portion of the end surface.

7. A rotary motion detecting device that outputs a signal corresponding to a rotary motion of a rotary disk coupled to a shaft,
wherein a boss is fixed to the shaft,
the boss is fixed to one surface of the rotary disk, and
one of the boss and the shaft is a hole member including a hole formed therein and another is an inserted member that is inserted in the hole, and
wherein the hole member has an inner periphery that is larger than an outer periphery of the inserted member so that the shaft is vertical to the rotary disk without being restricted by the boss,
wherein one of a bottom surface located at a bottom of the hole and an end surface of the inserted member that faces the bottom surface has a hollow and another has a protrusion, and
the hollow and the protrusion abut on each other and respective axis lines of the rotary disk and the shaft coincide with each other.

8. The rotary motion detecting device according to claim 1, wherein the fixing member is filled in a space between the hole member and the inserted member, and
wherein the fixing member is filled in the space to set a position of the inserted member with respect to the hole member.

9. The rotary motion detecting device according to claim 3, wherein the fixing member is filled in a space between the hole member and the inserted member, and
wherein the fixing member is filled in the space to set a position of the inserted member with respect to the hole member.

10. The rotary motion detecting device according to claim 1,
wherein the inserted member is angularly adjusted with respect to an axis of the hole member after the fixing member is filled in the space, thereby changing a shape of a space between the hole member and the inserted member.

11. The rotary motion detecting device according to claim 1, wherein the fixing member is filled in a space between the hole member and the inserted member after the inserted member is inserted in the hole member, and
wherein the inserted member is angularly adjusted with respect to an axis of the hole member to align an axis of the fixing member to an axis of the rotary disk.

12. The rotary motion detecting device according to claim 1, wherein a space between the hole member and the inserted member is sized to allow for an angular movement of the inserted member with respect to an axis of the hole member.

13. The rotary motion detecting device according to claim 1, wherein the fixing member is positioned on all sides the inner periphery of the hole member.

14. The rotary motion detecting device according to claim 3, wherein the fixing member is positioned on all sides the inner periphery of the hole member.

15. The rotary motion detecting device according to claim 1, wherein the fixing member is positioned between an end surface of the inserted member and a bottom surface of the hole member.

16. The rotary motion detecting device according to claim 1, further comprising a plurality of fixing members equally spaced around the inserted member, each fixing member of the plurality of fixing member penetrates through the boss into the hole member to fix the inserted member in place with respect to the rotary disk.

17. The rotary motion detecting device according to claim 1, wherein a bottom surface of the hole member includes a protrusion,
wherein an end surface of the inserted member includes a hollow portion, and
wherein the protrusion fits into the hallow portion.

18. The rotary motion detecting device according to claim 17, wherein a height of the protrusion is greater than a depth of the hallow portion such that the protrusion abuts the hallow portion.

19. The rotary motion detecting device according to claim 17, wherein the protrusion is positioned on the hole member to align with an axis of the rotary disk.

\* \* \* \* \*